US009657569B2

(12) United States Patent
Ikarashi et al.

(10) Patent No.: US 9,657,569 B2
(45) Date of Patent: May 23, 2017

(54) HYDRAULIC SOURCE CONTROL DEVICE, INJECTION MOLDING APPARATUS, AND METHOD OF CONTROLLING HYDRAULIC SOURCE

(71) Applicant: MITSUBISHI HEAVY INDUSTRIES PLASTIC TECH. CO.,LTD., Nagoya-shi, Aichi-ken (JP)

(72) Inventors: Masaaki Ikarashi, Nagoya (JP); Toshimichi Sugita, Nagoya (JP); Yasuo Okochi, Nagoya (JP)

(73) Assignee: MITUBISHI HEAVY INDUSTRIES PLASTIC TECHNOLOGY CO., LTD., Nagoya-shi (JP)

( * ) Notice: Subject to any disclaimer, the term of this patent is extended or adjusted under 35 U.S.C. 154(b) by 763 days.

(21) Appl. No.: 13/728,647

(22) Filed: Dec. 27, 2012

(65) Prior Publication Data
US 2014/0183771 A1    Jul. 3, 2014

(30) Foreign Application Priority Data

Aug. 10, 2012   (JP) ................ 2012-178566

(51) Int. Cl.
*F01B 25/00*       (2006.01)
*B29C 45/82*       (2006.01)
(52) U.S. Cl.
CPC .............. *F01B 25/00* (2013.01); *B29C 45/82* (2013.01); *B29C 2945/76498* (2013.01);
(Continued)
(58) Field of Classification Search
CPC ......... F16H 61/42; B29C 45/82; B29C 45/76; B29C 45/00; F04B 49/06
See application file for complete search history.

(56) References Cited

U.S. PATENT DOCUMENTS 4,044,653 A  *  8/1977  Aoki ............... B29C 45/531
                                          164/155.4
4,474,104 A  *  10/1984  Creffield ............ F04B 49/06
                                          417/18
(Continued)

FOREIGN PATENT DOCUMENTS

CN      101473138 A      7/2009
JP      62-174126 A      7/1987
(Continued)

OTHER PUBLICATIONS

Office Action dated May 21, 2015, issued in counterpart Chinese patent application No. 201210532092.9, with English translation (12 pages).

(Continued)

*Primary Examiner* — Monica Huson
(74) *Attorney, Agent, or Firm* — Westerman, Hattori, Daniels & Adrian, LLP

(57) ABSTRACT

The hydraulic source control device includes an operation input device capable of inputting operation conditions regarding the driving force of a fluid pressure control element, a servo motor including a motor section that drives a hydraulic pump and an amplifier that drives the motor section, and a controller that outputs a control command to the servo motor based on an input result to the operation input device. The controller obtains the fluid pressure of a working fluid based on the operation conditions regarding the input driving force, computes the output torque of the motor section based on the relationship between the fluid pressure and the output torque that are stored in advance, and outputs the computed output torque to the amplifier as a control command of the torque limitation value of the servo motor.

8 Claims, 4 Drawing Sheets

(52) U.S. Cl.
CPC ............... *B29C 2945/76511* (2013.01); *B29C 2945/76785* (2013.01); *B29C 2945/76939* (2013.01)

(56) References Cited

U.S. PATENT DOCUMENTS

| | | | | |
|---|---|---|---|---|
| 5,944,492 | A | * | 8/1999 | Konishi ................ E02F 9/2235 417/222.1 |
| 6,341,953 | B1 | * | 1/2002 | Okubo .................... B29C 45/82 264/40.7 |
| 6,748,739 | B1 | * | 6/2004 | Hirano .................... F04B 49/06 417/44.2 |

FOREIGN PATENT DOCUMENTS

| | | |
|---|---|---|
| JP | 6-013185 B2 | 2/1994 |
| JP | 8-68077 A | 3/1996 |
| JP | 2634291 B2 | 7/1997 |
| JP | 2002-225103 A | 8/2002 |
| JP | 2004-030498 A | 1/2004 |
| JP | 2004-174502 A | 6/2004 |
| JP | 2004-276071 A | 10/2004 |
| JP | 2005-233050 A | 9/2005 |
| JP | 2008-8258 A | 1/2008 |
| JP | 2009-215935 A | 9/2009 |
| JP | 2010-105291 A | 5/2010 |
| JP | 4550874 B2 | 9/2010 |
| JP | 4582981 B2 | 11/2010 |
| JP | 4756449 B2 | 8/2011 |
| JP | 2012-086246 A | 5/2012 |
| WO | 01/06126 A1 | 1/2001 |
| WO | 2007/114339 A1 | 10/2007 |

OTHER PUBLICATIONS

Office Action dated Jan. 6, 2015, issued in corresponding Japanese Patent Application No. 2012-178566, with English translation (11 pages).

* cited by examiner

HYDRAULIC SOURCE CONTROL DEVICE, INJECTION MOLDING APPARATUS, AND METHOD OF CONTROLLING HYDRAULIC SOURCE

BACKGROUND OF THE INVENTION

Field of the Invention

The present invention relates to a hydraulic source control device, and an injection molding apparatus including the hydraulic source control device.

Priority is claimed on Japanese Patent Application No. 2012-178566 filed on Aug. 10, 2012, the contents of which are incorporated herein by reference.

Description of Related Art

In recent years, in apparatuses, such as an injection molding machine and a press forming machine, in order to reduce the energy loss when operating respective control elements or to perform high-precision control, an electric actuator including a servo motor or the like may be used instead of a hydraulic circuit using a working fluid, such as an oil. However, if such an electric actuator is used, there are controlled objects in which control is complicated or the number of parts increases. Therefore, not the electric actuator but the hydraulic circuit is continuously utilized for a controlled object in which control is easier if the hydraulic circuit is used.

In a case where a control element is driven using the hydraulic circuit, generally, a fixed capacity type hydraulic pump is driven by an electric motor. As the electric motor that drives the hydraulic pump, for example, a three-phase induction motor is known. In a case where this three-phase induction motor is used, the flow rate of a working fluid to be discharged also becomes constant because rotational speed is kept constant. Therefore, an extra working fluid exceeding a flow rate that is required for holding a predetermined fluid pressure, is sequentially discharged from a relief valve or the like, and an energy loss is caused by an amount equivalent to this discharged working fluid.

Thus, PCT International Publication No. WO2007/114339 suggests that a variable speed motor having a variable rotational speed be used instead of the three-phase induction motor, and the variable speed motor be controlled so that the flow rate and fluid pressure of a hydraulic pump become command values. In a case where the variable speed motor is used, if the rotational speed is reduced when holding the fluid pressure, it is possible to reduce the discharge amount of the working fluid by a corresponding amount to reduce an energy loss.

On the other hand, in a case where the variable speed motor is used, the flow rate of the hydraulic pump is set by setting a required rotational speed. However, since the leakage amount between fluid chambers bisected by a piston head of a hydraulic cylinder or the leakage amount of a hydraulic valve part or the like is not always constant, the rotational speed of the hydraulic pump is set so that the flow rate of the hydraulic pump becomes a desired flow rate at which the hydraulic cylinder is operated, a flow rate to which the maximum value of the leakage amount of a working fluid that is assumed or obtained by experiments is added, or a flow rate higher than that. Therefore, although the flow rate of an extra working fluid discharged from the relief valve or the like itself is reduced, the working fluid discharged without being utilized is still present, and becomes an energy loss.

Japanese Unexamined Patent Application, First Publication No. 2002-225103 suggests performing feedback control of the rotating speed of a hydraulic pump using a fluid pressure detected by a fluid pressure sensor, in order to obtain the actual fluid pressure of a working fluid supplied to a mold clamping cylinder as a desired fluid pressure. In a case where feedback control is performed by such a fluid pressure sensor, it is possible to discharge a working fluid of an amount equivalent to a leakage amount from the hydraulic pump without excess or deficiency, and it is possible to hold the working fluid at a desired fluid pressure.

However, in a case where the variable speed motor is used, the feedback control of the rotational speed is performed based on a detection result of the fluid pressure sensor. Therefore, there is a possibility that control may oscillate and fluid pressure may not be stable in the case of a complicated drive system that is easily disturbed, and there is a problem in that control becomes complicated in a case where an attempt to suppress oscillation is made. Additionally, since the fluid pressure sensor or the like should be added in order to perform the feedback control, there is a problem in that the number of parts will increase and lead to cost increase. Additionally, since the feedback control is performed, for example, in a case where the fluid pressure has overshot a predetermined value, the hydraulic pump should be reversely rotated immediately to cause the working fluid to flow back to the hydraulic circuit to lower the fluid pressure. However, since the fluid pressure is reversed from a positive pressure to a negative pressure at this time, and an inflection point where flow is reversed and the fluid pressure is zero is crossed, supply control of the working fluid is apt to become unstable.

SUMMARY OF THE INVENTION

The present invention has been made in view of the above circumstances, and provides a hydraulic source control device capable of saving energy without increasing the number of parts or complicating control, and an injection molding apparatus including the hydraulic source control device.

A hydraulic source control device related to the present invention includes: a hydraulic pump that discharges a working fluid; an operation input device capable of inputting operation conditions of a fluid pressure control element of which the driving is controlled by the working fluid discharged from the hydraulic pump; a servo motor including a motor section that drives the hydraulic pump and an amplifier that drives this motor section; and a control device that outputs a control command to the servo motor based on an input result to the operation input device, wherein the control device includes a limit torque computing device that obtains the fluid pressure of the working fluid that is required in order to output the driving force from the fluid pressure control element, based on operation conditions regarding the driving force of the fluid pressure control element input from the operation input device and that computes the output torque of the motor section based on the relationship between the pressure of the hydraulic pump and the output torque of the motor section that are stored in advance, and wherein the control device outputs the output torque computed by the limit torque computing device to the amplifier as a control command of the torque limitation value of the servo motor. In addition, the torque limitation in the present invention means not performing feedback control of the torque of the servo motor in order to maintain a constant torque value but limiting the maximum torque of the servo motor so as not to exceed a predetermined torque value.

By operating in this way, if operation conditions regarding the driving force of the fluid pressure control element is input via the operation input device, the fluid pressure of the working fluid can be obtained from the operation conditions regarding the driving force, and the output torque of the motor section corresponding to this operating fluid pressure, that is, the output torque of the motor section when the working fluid is discharged from the hydraulic pump can be obtained. Moreover, since the driving of the motor section can be performed by the amplifier of the servo motor, with the output torque computed by the limit torque computing device as the torque limitation value, it is possible to limit the fluid pressure in the hydraulic circuit on the output side of the hydraulic pump and reduce the flow rate of the working fluid so that the driving force of the fluid pressure control element does not exceed the operation conditions.

Moreover, the hydraulic source control device in the present invention may allow the operation input device is an input device capable of inputting a plurality of stages of driving forces of the fluid pressure control element, and wherein the control device computes the output torque of the motor section for each of the plurality of stages of driving forces of the fluid pressure control element input from the operation input device, and outputs the output torques to the amplifier, respectively, as control commands of the torque limitation value of the servo motor.

By operating in this way, the multi-stage clamping force molding of performing molding while changing a clamping force with lapse of time becomes easy.

Moreover, the hydraulic source control device related to the present invention may further include a backflow prevention device for preventing the working fluid discharged from the hydraulic pump from flowing back and the hydraulic pump rotating reversely, in the above hydraulic source control device.

By operating in this way, the working fluid of the hydraulic circuit can be prevented from flowing back to the hydraulic pump. Therefore, a force in a direction opposite to a normal direction can be prevented from being applied to a filter or the like provided on the suction side of the hydraulic pump, and the present invention can also be used with a hydraulic pump that may be damaged when used by reverse rotation. Moreover, since the flow direction of the working fluid always becomes one direction without being reversed by preventing the backflow of the working fluid, the supply control in which the working fluid is stable becomes easy.

Moreover, the hydraulic source control device according to the present invention may include, in the above hydraulic source control device, a revolution calculation device that obtains the flow rate of the working fluid required in order to operate the fluid pressure control element at the operating speed based on the operation conditions regarding the operating speed of the fluid pressure control element input from the operation input device and that computes the rotational speed of the motor section corresponding to the flow rate discharged from the hydraulic pump based on the relationship between the flow rate of the working fluid discharged from the hydraulic pump and the rotational speed of the motor section, which are stored in advance, and wherein the control device outputs the rotational speed calculated by the revolution calculation device to the amplifier as a control command of the rotational speed of the servo motor.

By operating in this way, in a case where the driving force of the fluid pressure control element has not reached operation conditions (for example, the torque limitation value of the servo motor that drives the aforementioned hydraulic pump) regarding the driving force input from the operation input device, the rotational speed of the motor section can be controlled so that the operating speed of the fluid pressure control element becomes an operation condition regarding the operating speed input to the operation input device.

An injection molding apparatus related to the present invention includes the above hydraulic source control device.

By operating in this way, for example, when various fluid pressure control elements, such as a mold clamping cylinder of the injection molding apparatus, are driven, the flow rate of the working fluid discharged from the hydraulic pump can be reduced, which is effective in energy saving, particularly in a case where high fluid pressure is required but the required flow rate of the working fluid is small like a mold clamping boosting process of boosting the fluid pressure to be supplied to the mold clamping cylinder up to a predetermined fluid pressure after a fixed mold and a movable mold are brought into close contact with each other. Additionally, the same effects can be obtained even in a case where the present invention is applied to a nozzle touch cylinder, a mold opening and closing cylinder, or the like that moves an ejector or an injection unit that ejects a molded article.

Additionally, the injection molding apparatus related to the present invention may be the above injection molding apparatus in which the hydraulic source control device is connected in parallel to a plurality of the fluid pressure control elements, and a control valve is provided in a passage that is connected to each fluid pressure control element.

By operating in this way, it is possible to stably supply the working fluid of the hydraulic pump to the plurality of fluid pressure control elements, and to individually adjust the working fluid to be supplied to each fluid pressure control element, using the control valve.

A method of controlling a hydraulic source for an injection molding apparatus related to the present invention includes the steps of: providing a hydraulic pump that discharges a working fluid, an operation input device capable of inputting operation conditions of a fluid pressure control element of which the driving is controlled by the working fluid discharged from the hydraulic pump, a servo motor including a motor section that drives the hydraulic pump and an amplifier that drives this motor section, and a control device that outputs a control command to the servo motor based on an input result to the operation input device; obtaining the fluid pressure of the working fluid that is required in order to output the driving force from the fluid pressure control element, based on operation conditions regarding the driving force of the fluid pressure control element input from the operation input device with a limit computing device provided to the control device; computing the output torque of the motor section with the limit computing device based on the relationship between the pressure of the hydraulic pump and the output torque of the motor section that are stored in advance; and outputting the output torque computed by the limit torque computing device to the amplifier as a control command of the torque limitation value of the servo motor from the control device.

By operating in this way, if operation conditions regarding the driving force of the fluid pressure control element is input via the operation input device, the fluid pressure of the working fluid can be obtained from the operation conditions regarding the driving force, and the output torque of the motor section corresponding to this operating fluid pressure, that is, the output torque of the motor section when the working fluid is discharged from the hydraulic pump can be obtained. Moreover, since the driving of the motor section can be performed by the amplifier of the servo motor, with the output torque computed by the limit torque computing device as the torque limitation value, it is possible to limit the fluid pressure in the hydraulic circuit on the output side of the hydraulic pump and reduce the flow rate of the working fluid so that the driving force of the fluid pressure control element does not exceed the operation conditions.

According to the hydraulic source control device, the injection molding apparatus, and the method of controlling a hydraulic source related to the present invention, since it is not necessary to perform the feedback control using fluid pressure, it is possible to achieve energy saving without increasing the number of parts or complicating control.

DETAILED DESCRIPTION OF THE INVENTION

Next, a hydraulic source control device in a first embodiment of this invention and an injection molding apparatus including the hydraulic source control device will be described with reference to the drawings.

Figure 1:
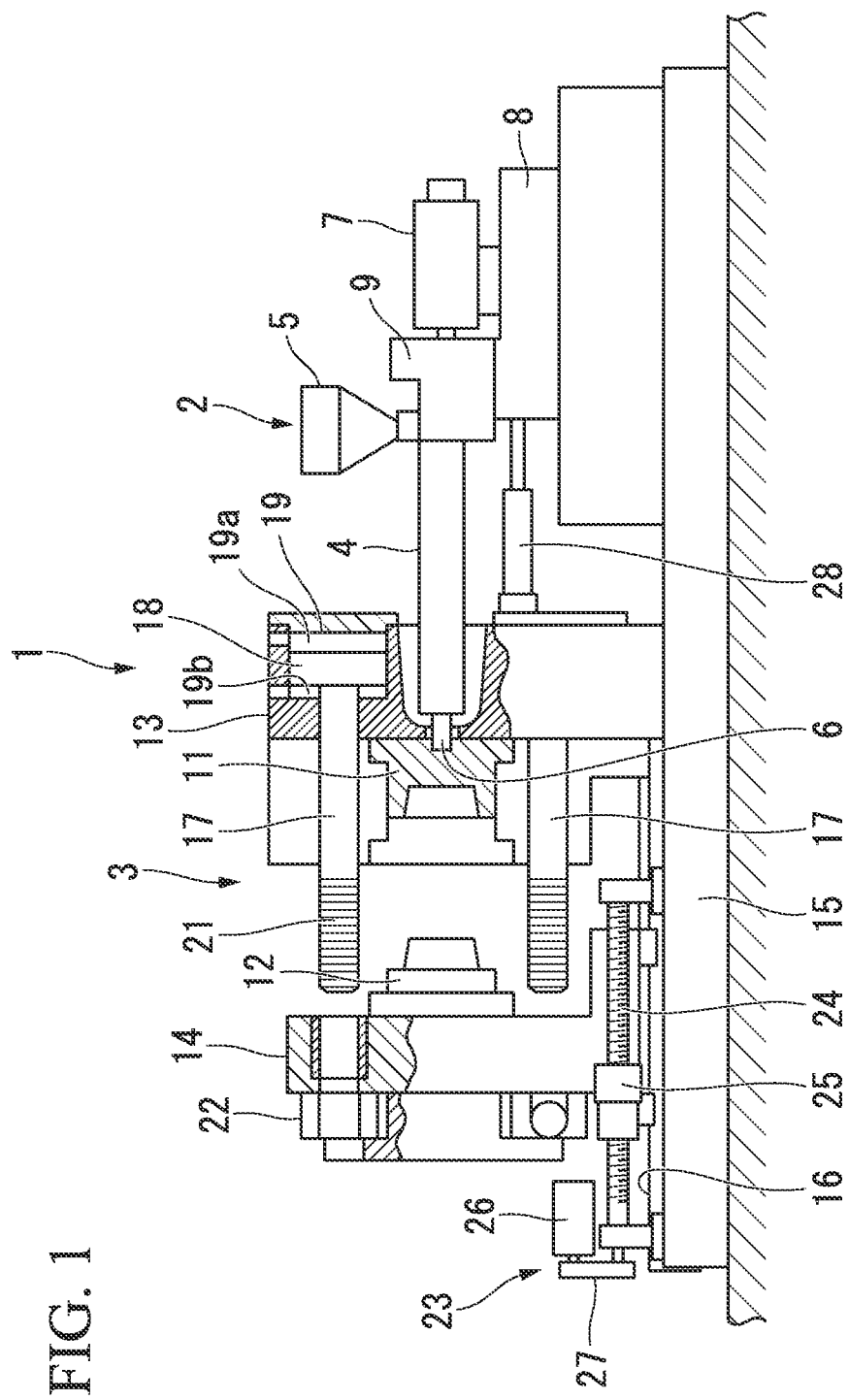
FIG. 1 is a side view showing a schematic configuration of an injection molding apparatus in an embodiment of this invention.

FIG. 1 is a side view showing a schematic configuration of the injection molding apparatus in the embodiment of this invention.

As shown in FIG. 1, the injection molding apparatus 1 includes an injection unit 2 and a mold clamping unit 3. In the injection unit 2, a heating cylinder part 4 that heats a molding material and injects and charges the molding material into a mold at high pressure is provided so as to extend in the horizontal direction at a housing 9 fixed to the top face of a slide 8, and a hopper 5 for loading the molding material is attached to the top face of the housing 9 so as to communicate with an upper portion of the heating cylinder part 4 on the base side. An injection nozzle 6 is formed at one end of the heating cylinder part 4 on the mold clamping unit 3 side, and a screw (not shown) is fitted into the heating cylinder part 4 so as to be rotatable and movable in the horizontal direction with respect to the heating cylinder part 4. An actuator 7 capable of moving the screw provided inside the heating cylinder part 4 in the horizontal direction is attached to the side of the heating cylinder part 4 opposite to the injection nozzle 6 so as to be movable relative to the slide 8. In addition, as the actuator 7, electric motor-driven ball screws or electric actuators, such as a linear motor, can be used. Additionally, electric motors, such as an inverter motor, a servo motor, and an IPM motor, capable of controlling rotational speed, can be used as the motor (not shown) that rotates the screw. In addition, although this embodiment shows the actuator 7 as the electric actuator, the actuator may not be the electric actuator, and actuators, such as a hydraulic cylinder, may be used. In this case, blade type or piston type hydraulic motors can be used as the motor (not shown) that rotates the screw. Additionally, even in a case where a hydraulic actuator is used as the actuator 7, there is no problem even if the electric motor is used as the motor that rotates the screw, achieving the energy-saving effect.

The screw inside the heating cylinder part 4 is rotationally driven to gradually convey a molding material loaded from the hopper 5 to the injection nozzle 6 side, and heats, plasticizes, and melts the molding material during this conveyance. Then, if the screw is pressed to the injection nozzle 6 side by the actuator 7, a compressive force acts on the plasticized molding material, and the molding material is injected into the mold of the mold clamping unit 3 from the injection nozzle 6.

The mold clamping unit 3 performs the opening and closing between a fixed mold 11 and a movable mold 12 that face each other. While the fixed mold 11 is supported by a fixed platen 13 erected on the injection unit 2 side of the mold clamping unit 3, the movable mold 12 is supported by a movable platen 14 erected on the side opposite to the injection unit 2 side. The fixed platen 13 is fixedly supported to a base portion 15, and the movable platen 14 is supported so as to be slidable in the direction in which the movable platen approaches and separates from the fixed platen 13 along a guide 16 provided to extend on the base portion 15.

A plurality of, more specifically, four tie-bars 17 are attached to the fixed platen 13 so as to extend in the horizontal direction. Each of the tie-bars 17 has a piston head 18 at one end, and end portions each including the piston head 18 are fitted into hydraulic mold clamping cylinders 19 provided at four corners of the fixed platen 13. The mold clamping cylinder 19 includes two cylinder chambers 19a and 19b partitioned in the extending direction thereof by the piston head 18, and the piston head 18 slides according to the fluid pressure differential of the working fluid supplied into the cylinder chambers 19a and 19b so that the tie-bar 17 can be displaced in the extending direction. In addition, although an example in which the mold clamping cylinders 19 are provided at four corners of the fixed platen 13 is shown in the present embodiment, the mold clamping cylinders 19 may be direct-pressure type mold clamping cylinders arranged at the back face (face opposite to the fixed platen 13) of the movable platen 14.

A gripped portion 21 is provided at the tie-bar 17 on the movable platen 14 side. A plurality of annular groove-shaped irregularities is formed in the gripped portion 21 on the outer peripheral surface of the tie-bar 17. On the other hand, a tie-bar gripper 22 that grips the gripped portions 21 of the tie-bars 17 is engageably attached to the movable platen 14. An ejector (not shown) for further pressing a molded article after injection molding to release the molded article from the movable mold 12 is attached to the movable platen 14. The ejector advances and retracts a rod member (not shown) using an electric actuator or the like, thereby pressing and releasing the molded article. In addition, the ejector may be a hydraulic actuator, such as a hydraulic cylinder.

A mold opening and closing mechanism 23 for slidingly moving the movable platen 14 when the mold is opened and closed is attached to the movable platen 14. The mold opening and closing mechanism 23 includes a ball screw part 24 that is rotatably supported along the guide 16 of the movable platen 14, a nut part 25 that is fixed to the movable platen 14 and is screwed to the ball screw part 24, a driving source 26, such as a servo motor, which rotates the ball screw part 24, and a transmission mechanism part 27 that transmits the rotation of the driving source 26 to the ball screw part 24. According to the mold opening and closing mechanism 23, the driving source 26 can be rotationally driven, for example, to rotate the ball screw part 24 in one direction to broaden the interval between the fixed platen 13 and the movable platen 14 and to rotate the other ball screw part 24 in other direction to narrow the interval between the fixed platen 13 and the movable platen 14. In addition, the mold opening and closing mechanism 23 may be actuators, such as a hydraulic cylinder.

The above-described injection unit 2 is adapted to be movable in the extending direction of the heating cylinder part 4 relative to the fixed platen 13, and a nozzle touch cylinder 28 that adjusts the distance between the fixed platen 13 and the injection unit 2 is attached between the fixed platen 13 and the above-described injection unit 2. While the injection nozzle 6 moves to an injection position where resin is injected into the fixed mold 11, that is, a position where the injection nozzle 6 abuts against the fixed mold 11 if this nozzle touch cylinder 28 is displaced in a retracted direction, the injection nozzle 6 is separated from the fixed mold 11 if the nozzle touch cylinder 28 is displaced in an extended direction.

Next, the operation in the above-described injection molding apparatus 1 will be described.

First, the movable platen 14 is moved to the fixed platen 13 side by the mold opening and closing mechanism 23, and the movable mold 12 is made to abut against the fixed mold 11. Thereafter, alternatively, the tie-bars 17 and the movable platen 14 are coupled by the tie-bar gripper 22 in parallel with the operation of making the movable mold 12 abut against the fixed mold 11. Next, the tie-bars 17 are displaced to the injection unit 2 side by the mold clamping cylinders 19, and the movable mold 12 is brought into pressure contact with to the fixed mold 11. Moreover, the injection nozzle 6 is brought into pressure contact with the fixed mold 11 by the nozzle touch cylinder 28, a plasticized molding material is injected into the molds from the injection nozzle 6 of the injection unit 2, and the molding material is cooled and molded while applying a holding pressure.

Next, the fluid pressure of the mold clamping cylinder 19 is extracted and the pressure contact between the movable mold 12 and the fixed mold 11 is released, or the fluid pressure of the mold clamping cylinder 19 is extracted, the pressure contact between the movable mold 12 and the fixed mold 11 is released, and the movable mold 12 is separated from the fixed mold 11 by a minute distance. Thereafter, the tie-bar gripper 22 is opened, the coupling between the tie-bars 17 and the movable platen 14 is released, the movable platen 14 is moved at high speed in the direction opposite to the fixed platen 13 by the mold opening and closing mechanism 23, and the fixed mold 11 and the movable mold 12 are opened by a sufficient distance for taking out a molded article.

Thereafter, the molded article that comes into close contact with the movable mold 12 side is pressed from the inside by the ejector, and a molded article is taken out. In a case where the molded article comes into close contact with the fixed mold 11 side, the molded article is taken out by the ejector on the fixed mold 11 side.

According to the above respective steps, one cycle during which a molded article is formed from a molding material is completed. Then, the cycle is repeated in the mass production of molded articles.

Next, a hydraulic source control device 40 of the above-described injection molding apparatus 1 will be described. Although the injection molding apparatus 1 drives various control elements mainly using an electric actuator from a viewpoint of energy saving, control elements that can simplify control or control elements that can simplify configuration are controlled via a working fluid discharged from a hydraulic pump 42 that is a hydraulic source, using not the electric actuator but using a hydraulic circuit. The main control elements driven by fluid pressure in this way include the above-describe mold clamping cylinder 19, and the nozzle touch cylinder 28.

In addition, in a case where the injection molding apparatus includes, in addition to the main above control elements, control elements, which are to be used in an atmosphere in which an ambient environment reaches a high temperature and thermal expansion or thermal stress should be taken into consideration, such as actuators that should be assembled into small spaces, such as a cylinder for operating the core of a mold and an ejector cylinder for ejecting a molded article, and shut-off valve type nozzle opening and closing cylinders, the control using a hydraulic circuit that can be compactly configured with a simple structure and has little possibility of problems, such as damage caused by thermal expansion, may also be appropriately applied to these control elements.

Figure 2:
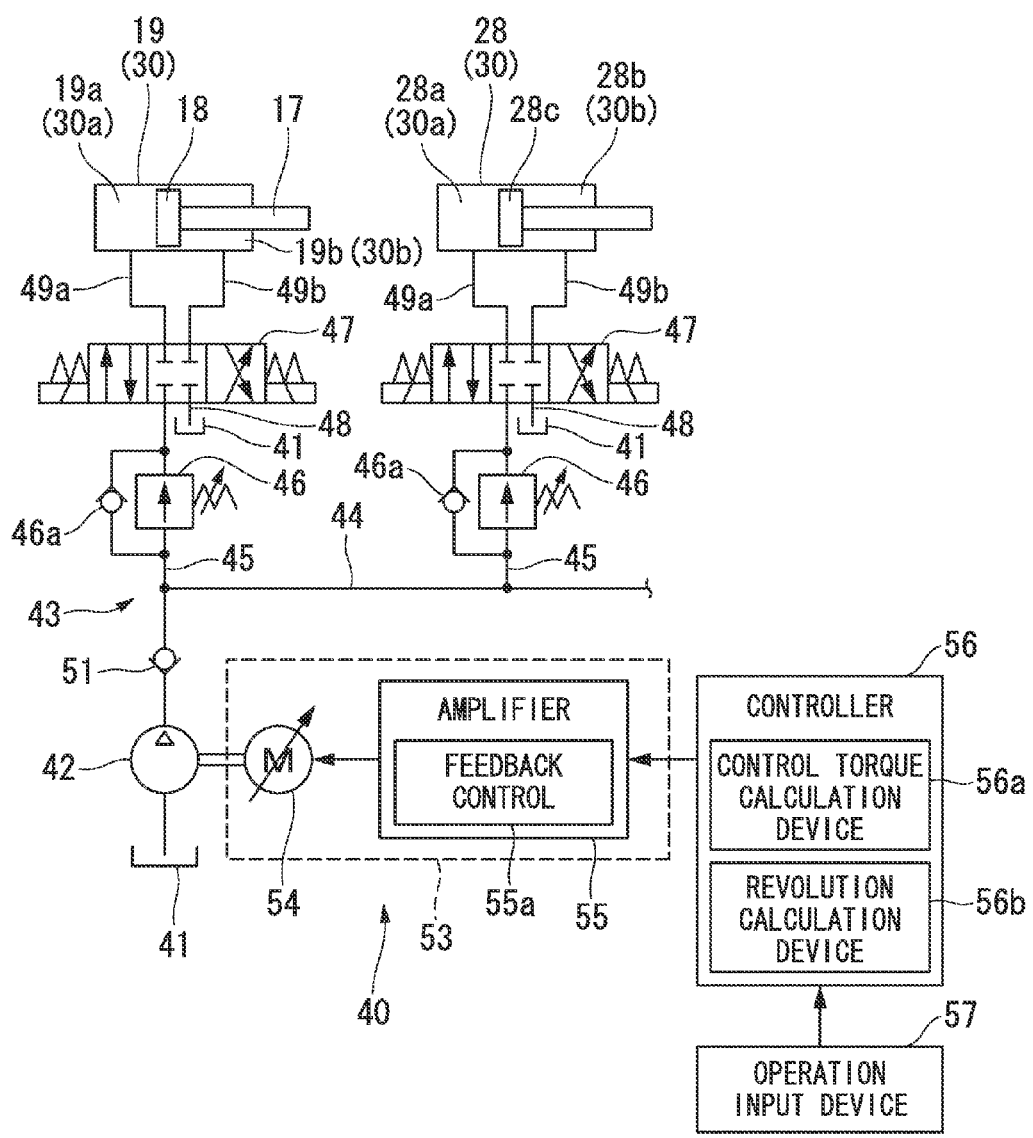
FIG. 2 is a block diagram of a hydraulic source control device of the injection molding apparatus.

As shown in FIG. 2, the hydraulic source control device 40 supplies a working fluid stored in a storage tank 41 to a hydraulic circuit 43 by means of the hydraulic pump 42 via a suction filter (not shown).

A main passage 44 is connected to the hydraulic pump 42, and a plurality of branch passages 45 is connected to the main passage 44. Individual fluid pressure control elements, such as the mold clamping cylinder 19 and the nozzle touch cylinder 28, are connected to these branch passages 45 via pressure control valves 46 and direction switching valves 47, respectively. In other words, a plurality of fluid pressure control elements is connected in parallel to the hydraulic pump 42 via the hydraulic circuit 43. In addition, as the hydraulic pump 42, either a hydraulic pump 42 that cannot be reversely rotated is used or a hydraulic pump 42 that can be reversely rotated is used. Additionally, in the following description, the mold clamping cylinder 19, the nozzle touch cylinder 28, and the like are simply referred to as fluid pressure control elements 30 except for when particularly distinguished.

The pressure control valve 46 reduces the fluid pressure of the working fluid supplied from the hydraulic pump 42 to a fluid pressure to be utilized in each fluid pressure control element 30. That is, the fluid pressure of the hydraulic pump 42 by the output side is generally held at a fluid pressure higher than a fluid pressure to be used in each of the fluid pressure control elements 30 that are connected in parallel to the hydraulic pump 42. In addition, although he pressure control valve 46 is provided with a check valve 46a that releases the working fluid to a primary side in a case where the fluid pressure on a secondary side becomes high, the check valve 46a may be omitted.

The above-described branch passage 45, and a drain passage 48 connected to the storage tank 41 are connected to the port of the direction switching valve 47 on the primary side. On the other hand, passages connected to the cylinder chambers of the fluid pressure control elements 30, more specifically, a passage 49a connected to one cylinder chamber 19a and a passage 49b connected to the other cylinder chamber 19b are connected to on a secondary-side port of the direction switching valve 47 in the case of the mold clamping cylinder 19. The channels formed inside the passages 49a and 49b communicate with the internal spaces of the cylinder chambers 19a and 19b, respectively.

Similarly, in a case where the fluid pressure control element 30 is the nozzle touch cylinder 28, the passage 49a is connected to one cylinder chamber 28a, and the passage 49b is connected to the other cylinder chamber 28b. In addition, in the following description, except for when particularly distinguished, the cylinder chambers 19a and 28a of the fluid pressure control elements 30 are referred to as cylinder chambers 30a, and the cylinder chambers 19b and 28b are referred to as cylinder chambers 30b.

The direction switching valves 47 have two switching positions where either the cylinder chambers 30a or the cylinder chambers 30b of the fluid pressure control elements 30 are made to communicate with the hydraulic pump 42, thereby generating fluid pressure, and the other cylinder chambers are made to communicate with the storage tank 41 and are opened to the atmosphere, and a switching position where the cylinder chambers 30a and the cylinder chambers 30b are cut off from the hydraulic circuit 43. That is, by displacing the switching position of the direction switching valves 47, it is possible to generate the fluid pressure differential between the cylinder chambers 30a and 30b that makes a pair, to reciprocate the piston heads 18 and 28c of the fluid pressure control elements 30.

A check valve (backflow prevention device) 51 is provided in the hydraulic circuit 43 so that a working fluid does not flow backwards toward the hydraulic pump 42 from the hydraulic circuit 43. In addition, if the hydraulic pump 42 can be prevented from being reversely rotated due to the backflow of a working fluid, the check valve is not limited to the check valve 51. For example, a circuit that returns the working fluid of the hydraulic circuit 43 to the storage tank 41 via a relief valve may be provided, or a forwardly rotating control command may be input to the servo motor 53 that drives the hydraulic pump 42 so as to resist a rotative force that is going to reversely rotate the hydraulic pump 42.

Moreover, a control command may be input to the servo motor 53 so as to hold a position where rotation is prohibited and a mechanical stopper or a brake may be provided in the servo motor 52.

Additionally, the arrangement position of the check valve 51 is not limited to the vicinity of a discharge port of the hydraulic pump 42, and may be on a passage for supplying a working fluid to the fluid pressure control element 30 from the hydraulic pump 42. In addition, in a case where the hydraulic pump 42 is reversely rotatable, and a suction filter (not shown) has sufficient backflow resistance, the check valve 51 may not be provided.

The servo motor 53 that rotates the hydraulic pump 42 is connected to the hydraulic pump 42. The servo motor 53 includes a motor section 54 in which a rotating shaft (not shown) thereof is associated with the hydraulic pump 42, and an amplifier 55 that supplies driving electric power to the motor section 54 and controls the voltage and current of the motor section to thereby rotate the rotational speed and output torque of the rotary shaft in the motor section 54.

Here, since the servo motor 53 in this embodiment has a configuration of a general servo motor, the amplifier 55 is indispensable in order to drive the motor section 54. The amplifier 55 has a function (feedback controller 55a) that performs feedback control of the rotational speed and output torque of the motor section 54 based on control commands, such as given rotational speed and output torque, as a general configuration. In addition, in the servo motor 53, the rotational speed of the motor section 54 is controlled by the output voltage of the amplifier 55, and the output torque of the motor section 54 is controlled by the output current of the amplifier 55.

A controller 56 that is a control device that outputs a control command to the amplifier 55 of the servo motor 53 is connected to the servo motor 53. An operation input device 57 that allows an operator to output a driving force that is required in the fluid pressure control element 30, such as a clamping force in the mold clamping cylinder 19, or various operation conditions, such as an operating speed that is required in the fluid pressure control element 30, is connected to the controller 56. In addition, the controller 56 may perform one function of the control device (not shown) that entirely or partially controls the injection molding apparatus 1.

In addition, in the description of this embodiment, a case where a "driving force" is input as the operation conditions of the fluid pressure control element 30 has been described. However, operation conditions regarding the driving force that is required in the fluid pressure control element 30 may be input. For example, the fluid pressure of the hydraulic circuit 43 required in order to obtain the driving force may be input, and may be input in a ratio (%) to the specification value of the maximum clamping force of the injection molding apparatus 1. Additionally, a case where an "operating speed" is input as operation conditions of the fluid pressure control element 30 has been described. However, operation conditions regarding the operating speed of the fluid pressure control element 30 may be input. For example, the flow rate of a working fluid required in order to obtain the operating speed may be input, and may be input in a ratio (%) to the specification value of the maximum operating speed of the injection molding apparatus 1.

Figure 3:
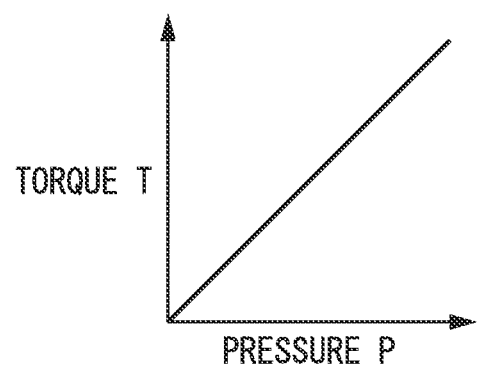
FIG. 3 is a graph showing the relationship between the output torque of a servo motor of the hydraulic source control device and the fluid pressure of a hydraulic circuit.

A storage section (not shown), such as a nonvolatile memory, is connected to or built in the controller 56, and the relationship between the fluid pressure (hereinafter, simply referred to as operating fluid pressure) of the main passage 44 of the hydraulic circuit 43 and the output torque of the motor section 54 for obtaining the operating fluid pressure is stored using maps, tables, or expressions. FIG. 3 is a graph showing the relationship between the output torque T of the motor section 54 and the operating fluid pressure P. As shown in FIG. 3, the output torque T and the operating fluid pressure P have a substantially proportional relationship, and this relationship is not substantially influenced by the rotational speed of the motor section 54.

Figure 4:
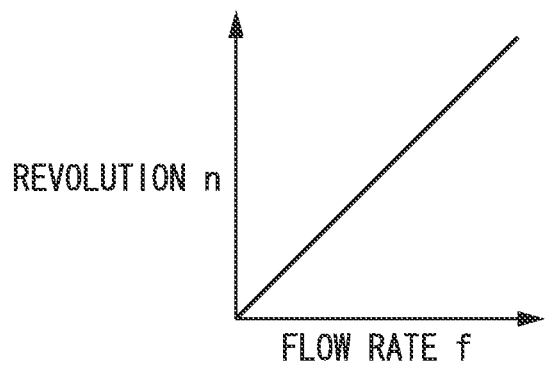
FIG. 4 is a graph showing the relationship between the rotational speed of the servo motor of the hydraulic source control device and the flow rate of a working fluid discharged from a hydraulic pump.

Additionally, the relationship between the rotational speed of the motor section 54 and the flow rate of a working fluid is stored in the storage section using maps, tables, or expressions. FIG. 4 is a graph showing the relationship between the revolution n of the motor section 54 and the flow rate f. As shown in FIG. 4, the revolution n and the flow rate f have a substantially proportional relationship.

Here, although the maps, tables, expressions, or the like showing the relationship between the operating fluid pressure and the output torque of the motor section 54 for obtaining the operating fluid pressure, and the relationship between the rotational speed of the motor section 54 and the flow rate of a working fluid may be obtained using hydrodynamic theoretical calculation expressions by modeling a hydraulic circuit 43 system, these may be obtained experimentally. That is, the fluid pressure or flow rate that is calculated by the theoretical calculation expressions may not quantitatively coincide with the fluid pressure or the flow rate in an actual hydraulic circuit due to the internal leak or inertia of a hydraulic pump or the variation of performance. For this reason, the relationship between the operating fluid pressure and the output torque of the motor section 54 for obtaining the operating fluid pressure and the relationship between the rotational speed of the motor section 54 and the flow rate of working fluid may be obtained in advance by experiments or the like, and may be turned into data tables or experimental formulas.

Referring back to FIG. 2, the controller 56 includes a limit torque computing device 56a and revolution calculation device 56b.

The limit torque computing device 56a computes an operating fluid pressure value corresponding to the driving force value input from the operation input device 57. This operating fluid pressure value can be computed based on various conditions, such as the driving force value and the piston diameter of the fluid pressure control element. Moreover, the limit torque computing device 56a obtains the output torque value of the motor section 54 corresponding to this computed operating fluid pressure value, based on the above-described relationship between the operating fluid pressure and the output torque, and outputs this as the upper limit of the output torque. The controller 56 outputs the upper limit of the output torque obtained by the limit torque computing device 56a to the amplifier 55 as a control command, using digital signals or the like.

For example, if a required clamping force is input to the operation input device 57 by an operator, the control command of the upper limit of the output torque is output from the controller 56 to the amplifier 55, and the amplifier 55 limits the output torque of the motor section 54 by the feedback control function of the servo motor 53. That is, simply by outputting the control command of the upper limit of the output torque from the controller 56 to the amplifier 55 without performing feedback control of the operating fluid pressure using the controller 56, it is possible to keep a driving force generated depending on the fluid pressure (operating fluid pressure) of a working fluid supplied to the hydraulic circuit 43 by the hydraulic pump 42 from exceeding the driving force value input from the operation input device 57.

On the other hand, the revolution calculation device 56b computes the flow rate of a working fluid corresponding to the operating speed input from the operation input device 57. Moreover, the revolution calculation device 56b obtains the rotational speed of the motor section 54 corresponding to this computed flow rate, based on the above-described relationship between the rotational speed and the flow rate. The controller 56 outputs the rotational speed obtained by the revolution calculation device 56b to the amplifier 55 as a control command, using digital signals or the like.

Next, an example of operation in the above-described hydraulic source control device 40 will be described referring to drawings. In the description of this operation, for example, in the fluid pressure control element 30, a case where the displacement of a piston is regulated depending on whether the piston has reached a stroke end or whether the movable mold 12 has abutted against the fixed mold 11 after the piston is displaced from one side toward the other side, and the load pressure that acts on the piston increases rapidly will be described as an example.

Figure 5:
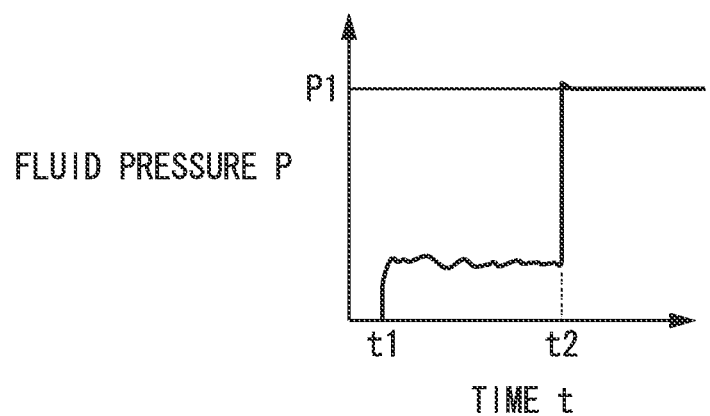
FIG. 5 is a graph showing the fluid pressure fluctuation of the hydraulic circuit in an example of the operation of the injection molding apparatus.
Figure 6:
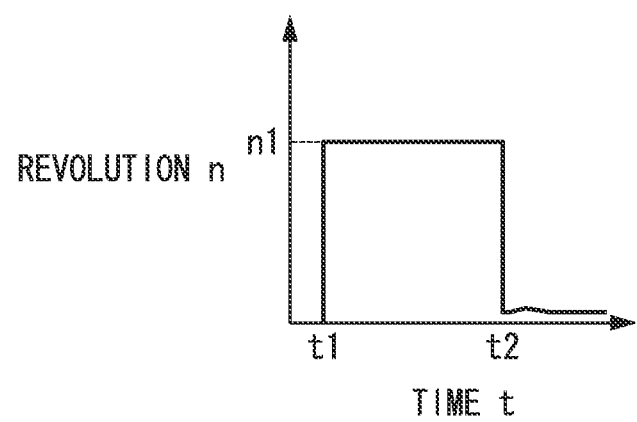
FIG. 6 is a graph showing the rotational speed fluctuation of the servo motor in an example of the operation of the injection molding apparatus.

If the hydraulic pump 42 begins to operate as shown in FIGS. 5 and 6 (time t1), discharge of a working fluid is started from the hydraulic pump 42. Thereby, the revolution n of the hydraulic pump 42 rises up to a revolution n1 obtained based on the operating speed input to the operation input device 57. At this time, the revolution n becomes constant at the revolution n1 until the load of the piston rises. That is, the piston is displaced at an operating speed input by the operation input device 57.

At this time, the operating fluid pressure P becomes a fluid pressure generated depending on the displacement load of the piston, and becomes a fluid pressure lower than a fluid pressure P1 obtained based on a driving force input to the operation input device 57.

Next, if the load that acts on the piston when the piston has reached the stroke end or the movable mold 12 has abutted against the fixed mold 11 increases rapidly and the displacement of the piston stops (time t2), the operating fluid pressure P tends to rise up to a fluid pressure higher than the fluid pressure P1. Then, torque limitation control is performed by the amplifier 55 so that the output torque in the motor section 54 of the servo motor 53 does not exceed an output torque corresponding to the driving force of the fluid pressure control element 30 input to the operation input device 57 so as not to exceed the fluid pressure P1 when the operating fluid pressure P has reached the fluid pressure P1.

At this time, the output torque capable of being generated by the servo motor 53 is simply controlled so as not to exceed the output torque value corresponding to the fluid pressure P1. However, fluid pressure continues being supplied so that the piston is displaced in the same direction, that is, so that the piston continues being pressed in a direction in which load increases, in a state where the piston has reached the stroke end or the load that acts on the piston increases rapidly and the displacement of the piston has stopped. Therefore, the fluid pressure does not drop consequently, and even if feedback control is not performed, the fluid pressure is maintained at the constant fluid pressure P1. That is, the force pressed by the piston becomes constant by the driving force input to the operation input device 57.

Incidentally, as the speed control of a general servo motor, feedback control of a position is performed so that the difference between the actual position of the servo motor and a command position output sequentially depending on pulse distribution becomes zero. However, in the torque limitation control of this embodiment, in order to prevent the rapid motor behavior caused by the accumulated pulse when load is removed, control is performed so that the difference between the position of the servo motor 53 and a command position output sequentially depending on pulse distribution is substantially negligible. Thereby, the revolution n of the motor section 54 drops to a rotational speed such that the fluid pressure P1 can be maintained, that is, a rotational speed corresponding to the flow rate such that an amount equivalent to leakage of a working fluid generated in the cylinder or the like of the fluid pressure control element 30 is compensated for.

That is, in a case where the mold clamping cylinder 19 is driven by the fluid pressure of a working fluid supplied from the hydraulic source control device 40 to perform a mold clamping process, the rotational speed of the hydraulic pump 42 can be maintained in a high state to increase the flow rate of the working fluid and the piston head 18 and the tie-bar 17 can be quickly displaced, until the driving force input to the operation input device 57 is obtained. Then, if the movable mold 12 is brought into pressure contact with the fixed mold 11, the load of the piston head 18 increases and the displacement amount of the piston head 18 becomes approximately zero, it is possible to reduce the flow rate of the working fluid as the displacement amount of the piston head 18, that is, the expansion of the cylinder chamber 30b becoming minute, thereby continuing bringing the fixed mold 11 and the movable mold 12 into pressure contact with each other with the driving force input to the operation input device 57.

That is, the feedback control of maintaining the torque of the servo motor 53 at a constant value is not performed, and the rotation of the servo motor 53 that drives the hydraulic pump 42 by mere action and reaction simply decreases in the relationship between the operating fluid pressure and the discharge pressure of the hydraulic pump 42. Thus, even in a case where disturbance is apt to occur in a configuration in which the hydraulic circuit 43 is complicated, the flow rate can be stably and smoothly reduced without oscillating the control of the servo motor 53.

Accordingly, according to the hydraulic source control device 40 in the above-described embodiment, if the driving force value of the fluid pressure control element 30 is input via the operation input device 57, an operating fluid pressure value can be obtained from the driving force value, and the output torque of the motor section 54 corresponding to this operating fluid pressure value, that is, the output torque of the motor section 54 when a working fluid is discharged from the hydraulic pump 42 can be obtained. Moreover, the driving of the motor section 54 can be performed by the amplifier 55 of the servo motor 53, with the output torque computed by the limit torque computing device 56a as the torque limitation value, effectively utilizing the feedback function of the output torque of the servo motor 53. Therefore, the flow rate of a working fluid can be reduced while limiting the operating fluid pressure so that the driving force of the fluid pressure control element 30 may not exceed the driving force value input from the operation input device 57 without performing the feedback control using the operating fluid pressure. As a result, since the circuit regarding the feedback control using the operating fluid pressure can be omitted, it is possible to reduce the flow rate of the working fluid discharged from the hydraulic pump 42 to achieve energy saving, without increasing the number of parts or complicating control.

Additionally, in a case where the temperature of the working fluid discharged from the hydraulic pump 42 is low, for example, during the start-up of the injection molding apparatus 1, the temperature of the working fluid within the hydraulic circuit 43 rises as the operating time of the injection molding apparatus 1 elapses. Since the viscosity of the working fluid decreases accordingly, there is a tendency for the pressure control characteristics of the fluid pressure cylinder in the hydraulic circuit 43 to be brought into an unsteady state, and an unstable control state occurs. In order to prevent this and to perform stable fluid pressure control from when the start-up of the injection molding apparatus 1 is started, a fluid pressure sensor (not shown) may be provided in the hydraulic circuit 43 to detect the fluid pressure in an unsteady state in the hydraulic circuit 43, a corrected fluid pressure value to which correction is added to the detected fluid pressure value by a predetermined correction device may be adopted as the aforementioned operating fluid pressure of this embodiment, the upper limit of the output torque of the motor section 54 may be obtained by the aforementioned method using this operating fluid pressure, and the torque limitation of the motor section 54 may be controlled using the upper limit of this output torque. In addition, the predetermined correction device is a preferably correction device in which the temperature of a working fluid is taken into consideration. That is, for example, if the operating fluid pressure capable of stable operation at predetermined arbitrary or predetermined individual temperatures is obtained as a stable operating fluid pressure in advance by experiments, simulation, or the like and is stored in the storage section, the temperature of a working fluid when the start-up of the operation of this injection molding apparatus 1 is started is measured with elapse of time by a temperature sensor, and the stable operating fluid pressure stored in the storage section corresponding to the temperature detected by this temperature sensor is selected, and is applied to control as a corrected fluid pressure value, the operating fluid pressure and temperature during the start-up of the injection molding apparatus 1 that is not settled uniquely and is apt to be unstable, due to unstable disturbance of the temperature rise process of members within the hydraulic circuit 43 can be treated as having a unique relationship, such as substantial proportion. Thus, stable control is possible.

Additionally, similarly, a flow rate sensor (not shown) may be provided in the hydraulic circuit 43 to detect the flow rate in an unsteady state in the hydraulic circuit 43, a detected flow rate value to which correction is added to the detected flow rate value by the predetermined correction device may be adopted as the aforementioned flow rate of a working fluid of this embodiment, the upper limit of the rotational speed of the motor section 54 may be obtained by the aforementioned method using this flow rate of the working fluid, and the rotational speed of the motor section 54 may be controlled using this rotational speed. In addition, the predetermined correction device is a preferably correction device in which the temperature of a working fluid is taken into consideration. At this time, the correction of the operating fluid pressure or the flow rate of the working fluid may be reflected by a proper control method, such as feedback control or feedforward control, and the reflection timing may be on time or and may be reflection in the following cycle. However, in order to have a simple apparatus configuration and a simple control configuration capable of easily obtaining stable control, it is preferable to reflect the correction in the following cycle.

Additionally, in a case where the driving force of the fluid pressure control element 30 has not reached the upper limit of the driving force input from the operation input device 57, the rotational speed of the motor section 54 can be controlled so that the operating speed of the fluid pressure control element 30 becomes an operation condition regarding the operating speed input to the operation input device 57. Therefore, the fluid pressure control element 30 can be operated at high speed according to operation situations.

Moreover, according to the injection molding apparatus 1 in the above-described embodiment, a working fluid that drives various fluid pressure control elements, such as the mold clamping cylinder 19, can be prevented from being wastefully discharged. Therefore, it is possible to achieve drastic energy saving (for example, about 50% compared to the related art).

Additionally, since the pressure control valve 46 is individually provided to each of the fluid pressure control elements connected in parallel to the hydraulic pump 42, it is possible to stably supply the working fluid of the hydraulic pump 42 to a plurality of fluid pressure control elements 30, and it is possible to individually adjust the pressure of the working fluid supplied to each of the fluid pressure control element 30, using the pressure control valve 46.

Moreover, since the working fluid of the hydraulic circuit 43 can be prevented from flowing back to the hydraulic pump 42 by including the check valve 51, a force in a direction opposite to a normal direction is applied to a suction filter or the like provided on the suction side of the hydraulic pump 42. Therefore, damage of parts, such as the suction filter, can be prevented, the applicable hydraulic pump 42 is not limited to one that permits reverse rotation, and the degree of freedom in the selection of the hydraulic pump 42 can be improved.

In addition, this invention is not limited to the configurations of the above-described respective embodiments, and design changes can be made without departing from the scope of the present invention.

For example, although a case where the driving force of the fluid pressure control element 30 is controlled so as to become one driving force input to the operation input device 57 has been described in the hydraulic source control device 40 of the above-described embodiments, the present invention is not limited to such control. For example, the present invention can also be applied to a case where a plurality of driving forces with different magnitudes is gradually and sequentially generated. In this case, a plurality of stages of arbitrary driving forces may be set in the operation input device 57 at desired driving timings, respectively. Then, these respective driving forces are sequentially switched between at predetermined timings.

In a case where the present invention is configured as described above, a plurality of operating fluid pressures P corresponding to a plurality of stages of driving forces is computed by the controller 56, and output torques T corresponding to the plurality of stages of driving forces obtained based on the relationship between the operating fluid pressures P and the output torques T that are stored in advance. Then, these output torques T are respectively output to the amplifier 55 as control commands of the upper limit of the output torque of the servo motor at the above-described predetermined timings.

Here, in a case where a plurality of stages of driving forces is generated as described above, it is necessary to allow the fluid pressure of the hydraulic circuit 43 to drop. However, in a case where the hydraulic pump 42 of the above-described embodiment is a hydraulic pump 42 that cannot be reversely rotated, the hydraulic pump 42 is adapted to be able to be reversely rotated by the check valve 51 or the like. Therefore, the hydraulic pump itself cannot lower the fluid pressure of the hydraulic circuit 43 with high response. Thus, in this modification, a relief valve capable of switching operation at arbitrary or a plurality of fluid pressures based on a control command is provided in the hydraulic circuit 43. Thereby, in a case where the fluid pressure of the hydraulic circuit 43 exceeds a fluid pressure corresponding to the driving force of each arbitrary stage, the fluid pressure can be quickly returned to the storage tank 41 via the relief valve, thereby reducing the pressure of the hydraulic circuit 43. In addition, a control command against reverse rotation may be output to the servo motor 53 instead of providing the check valve 51. At this time, as the hydraulic pump 42, it is preferable to use a pump in which a pump suction port and a pump discharge port do not communicate directly with each other, such as a gear type, a piston type, and a blade type. In such a pump, the suction port and discharge port for a working fluid do not communicate directly with each other like a swirl type hydraulic pump. Thus, if the pump is brought into a non-rotatable state, the backflow of the working fluid does not occur and the operating fluid pressure can be controlled simply by the rotation of the hydraulic pump 42.

According to the configuration of the modification, it is possible to perform precise operation based on a plurality of stages of driving forces using the fluid pressure control element 30, without adding comparatively expensive parts, such as a fluid pressure sensor and the reverse rotatable servo motor 53.

Moreover, an example in which the hydraulic source control device 40 is provided in the injection molding apparatus 1 has been described in the above-described embodiment. However, the present invention may be applied to apparatuses other than injection molding apparatus 1 as long as the apparatuses includes the fluid pressure control element 30 that performs control using a working fluid discharged from the hydraulic pump 42.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A hydraulic source control device comprising:
   a hydraulic pump that discharges a working fluid to a hydraulic circuit;
   an operation input device capable of inputting a driving force as an operation condition of a fluid pressure control element of which the driving is controlled by the working fluid discharged from the hydraulic pump;
   a servo motor including a motor section that drives the hydraulic pump and an amplifier that drives this motor section; and
   a control device that is configured to output a control command to the servo motor based on an input result to the operation input device,
   wherein the control device includes a storage section and a limit torque computing device,
   wherein the storage section stores a relationship between an operating fluid pressure of the hydraulic circuit and the output torque of the motor section for obtaining the operating fluid pressure, the relationship being obtained in advance using hydrodynamic theoretical calculation expressions by modeling a system of the hydraulic circuit or being obtained in advance experimentally,
   wherein the limit torque computing device is configured to obtain the operating fluid pressure that is required in order to output the driving force from the fluid pressure control element, based on the driving force of the fluid pressure control element input from the operation input device, and
   wherein the limit torque computing device is configured to compute the output torque of the motor section based on the relationship between the operating fluid pressure of hydraulic circuit and the output torque of the motor section that is stored in the storage section,
   wherein the control device outputs the output torque computed by the limit torque computing device to the amplifier as a control command of an upper limit of the output torque of the servo motor, and
   wherein the amplifier is configured to limit the output torque of the servo motor so as to not exceed the upper limit based on the control command of the upper limit of the output torque.

2. The hydraulic source control device according to claim 1,
   wherein the operation input device is an input device capable of inputting a plurality of stages of driving forces of the fluid pressure control element, and wherein the control device computes the output torque of the motor section for each of the plurality of stages of driving forces of the fluid pressure control element input from the operation input device, and outputs the output torques to the amplifier, respectively, as control commands of the torque limitation value of the servo motor.

3. The hydraulic source control device according to claim 1, further comprising a backflow prevention device for preventing the working fluid discharged from the hydraulic pump from flowing back and the hydraulic pump rotating reversely.

4. The hydraulic source control device according to claim 1,
wherein the control device includes revolution calculation device that obtains the flow rate of the working fluid required in order to operate the fluid pressure control element at the operating speed based on the operation conditions regarding the operating speed of the fluid pressure control element input from the operation input device and that computes the rotational speed of the motor section corresponding to the flow rate discharged from the hydraulic pump based on the relationship between the flow rate of the working fluid discharged from the hydraulic pump and the rotational speed of the motor section, which are stored in advance, and
wherein the control device outputs the rotational speed calculated by the revolution calculation device to the amplifier as a control command of the rotational speed of the servo motor.

5. An injection molding apparatus comprising the hydraulic source control device according to claim 1.

6. The injection molding apparatus according to claim 5, wherein the hydraulic source control device is connected in parallel to a plurality of the fluid pressure control elements, and a control valve is provided in a passage that is connected to each fluid pressure control element.

7. The hydraulic source control device according to claim 4, wherein
the control of the rotational speed of the servo motor is a feedback control that is performed so that the difference between the actual position of the servo motor and a command position output sequentially depending on pulse distribution becomes zero, and
a difference between the position of the servo motor and a command position output sequentially depending on pulse distribution is negligible, in a case where the output torque of the servo motor rises and reaches the upper limit, and the rotational speed of the servo motor drops to a rotational speed that maintains the upper limit by action and reaction in the relationship between an operating fluid pressure and a discharge pressure of the hydraulic pump.

8. The hydraulic source control device according to claim 4, wherein the storage section further stores a relationship between the rotational speed and the flow rate of the working fluid, the relationship being obtained in advance using hydrodynamic theoretical calculation expressions by modeling a system of the hydraulic circuit or being obtained in advance experimentally.

* * * * *